US012769662B2

(12) United States Patent
Jo et al.

(10) Patent No.: US 12,769,662 B2
(45) Date of Patent: Oct. 20, 2026

(54) MULTI-CORE PROCESSOR WITH TIMEOUT-BASED CACHE COHERENCE

(71) Applicant: Samsung Electronics Co., Ltd., Suwon-si (KR)

(72) Inventors: Jae-Eon Jo, Suwon-si (KR); Rohyoung Myung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/176,030

(22) Filed: Apr. 10, 2025

(65) Prior Publication Data

US 2026/0119402 A1 Apr. 30, 2026

(30) Foreign Application Priority Data

Oct. 30, 2024 (KR) ........................ 10-2024-0151207

(51) Int. Cl.
*G06F 12/0817* (2016.01)

(52) U.S. Cl.
CPC .... *G06F 12/0828* (2013.01); *G06F 2212/621* (2013.01)

(58) Field of Classification Search
CPC ........... G06F 12/0828; G06F 2212/621; G06F 2212/1024
See application file for complete search history.

(56) References Cited

U.S. PATENT DOCUMENTS

| | | | | |
|---|---|---|---|---|
| 8,397,030 | B2 | 3/2013 | Cantin et al. | |
| 10,901,902 | B2 | 1/2021 | Wilson et al. | |
| 2002/0103976 | A1* | 8/2002 | Steely, Jr. | G06F 12/0804 711/E12.027 |
| 2010/0100688 | A1* | 4/2010 | Harper | G06F 9/52 714/54 |
| 2014/0108736 | A1* | 4/2014 | Kuskin | G06F 12/1491 711/135 |
| 2023/0305872 | A1 | 9/2023 | Tsirkin | |
| 2025/0363054 | A1* | 11/2025 | Pan | G06F 12/0804 |

FOREIGN PATENT DOCUMENTS

| | | | |
|---|---|---|---|
| CN | 115437784 | A | 12/2022 |
| KR | 10-2017-0038268 | A | 4/2017 |

* cited by examiner

*Primary Examiner* — Jason W Blust
(74) *Attorney, Agent, or Firm* — NSIP Law

(57) ABSTRACT

A method includes forwarding, by a first core, a read request for a cache line to a first cache, forwarding, by the first cache, a Set-timeout shared-state request to a directory in response to the read request, forwarding, by the directory, the Set-timeout shared-state request to a second cache, in response to the Set-timeout shared-state request, changing a state of the cache line of the second core to a Shared state and forwarding a Shared-accepted response to the first cache and the directory, by the second cache, changing a state of the cache line of the directory and a state of the cache line of the first core to the Shared state, and performing a timeout to change a state of the cache line of the directory and a state of the cache line of the first core, in response to reaching a predetermined time.

20 Claims, 7 Drawing Sheets

MULTI-CORE PROCESSOR WITH TIMEOUT-BASED CACHE COHERENCE

CROSS-REFERENCE TO RELATED APPLICATIONS

This application claims the benefit under 35 USC § 119(a) of Korean Patent Application No. 10-2024-0151207, filed on Oct. 30, 2024, in the Korean Intellectual Property Office, the entire disclosure of which is incorporated herein by reference for all purposes.

BACKGROUND

1. Field

The following description relates to a multi-core processor with timeout-based cache coherency and an operating method thereof.

2. Description of Related Art

In modern computing environments, multicore processors are widely used, playing an important role in maximizing performance through parallel processing. Multicore processors share memory resources while processing tasks across multiple cores simultaneously. To manage this efficiently, cache memory is attached to each core. Cache memory can improve overall system performance by increasing memory access speed, however, maintaining cache coherence becomes an important issue when sharing data between cores. In particular, when multiple cores access the same data simultaneously, cache coherence management is required to ensure the latest status of the data is seen by the cores.

Existing cache coherence protocols manage the state of cache lines and maintain coherence by updating or invalidating data. However, these traditional methods complicate communication and control between cores and may cause unnecessary data transmission or processing delays in certain situations. In particular, improvements are needed in how to efficiently invalidate cache lines that are held by old data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an operating method of a multi-core processor includes forwarding, by a first core, a read request for a cache line to a first cache corresponding to the first core, forwarding, by the first cache, a Set-timeout shared-state request to a directory, in response to the read request, forwarding, by the directory, the Set-timeout shared-state request to a second cache corresponding to a second core, in response to the Set-timeout shared-state request, changing a state of the cache line of the second core to a Shared state and forwarding, by the second cache, a Shared-accepted response to the first cache and the directory, changing a state of the cache line of the directory and a state of the cache line of the first core to the Shared state, and performing a timeout, and in response to the timeout reaching a predetermined time, changing a state of the cache line of the directory and a state of the cache line of the first core.

The performing of the timeout may include determining, by each of the first core and the directory, whether the predetermined time is reached, and changing a state of the cache line of the directory to an Exclusive state and changing a state of the cache line of the first core to an Invalid state, based on a determination that the predetermined time has been reached.

The determining of whether the predetermined time is reached may include using a real-time counter (RTC) included in each of the first core and the directory.

The first core and the directory may each include a deadline buffer configured to store information on a timepoint at which a timeout occurs, and the determining of whether the predetermined time is reached may include comparing an RTC with time information stored in a first pointer of the deadline buffer.

The first core and the directory may each include an address buffer configured to store address information of the cache line, and the performing of the timeout may include, in response to reaching the predetermined time, changing a state of the cache line of the directory to the Exclusive state and changing a state of the cache line of the first core to the Invalid state, by referencing the address information of the cache line in the address buffer.

The deadline buffer may include information indicating a number of cache lines matching the information on a timepoint at which a timeout occurs.

The operating method may include, after the state of the cache line is changed to the Invalid state, increasing the first pointer of the deadline buffer by 1 and updating a first pointer of the address buffer based on the information indicating a number of cache lines.

The determining of whether the predetermined time is reached may include obtaining initial RTC information corresponding to a timepoint at which a state of the cache line of the directory and a state of the cache line of the first core were changed into the Shared state and determining that the predetermined time has been reached in response to the initial RTC information satisfying a predetermined bit condition.

The determining that the predetermined time has been reached may occur in a case where a determined bit remains in a same state as the initial RTC information while another determined bit meets a determined condition.

In another general aspect, a multi-core processor includes a first processing unit comprising a first core and a corresponding first cache, a second processing unit comprising a second core and a corresponding second cache, and a directory, wherein the first core is configured to forward a read request for a cache line to the first cache, wherein the first cache is configured to forward a Set timeout request to the directory, in response to the read request, wherein the directory is configured to forward the Set timeout request to the second cache, wherein the second cache is configured to, in response to the Set-timeout request, change a state of the cache line of the second core to a Shared state and forward a Set timeout response to the first cache and the directory, wherein the directory is configured to change a state of the cache line of the directory to the Shared state, wherein the first core is configured to change a state of the cache line of the first core to the Shared state, and wherein the directory and the first core are configured to perform a timeout, and in response to reaching a predetermined time, change a state of the cache line.

The first core and the directory may be configured to each determine whether the predetermined time is reached and change a state of the cache line of the directory to an Exclusive state and change a state of the cache line of the first core to an Invalid state, based on a determination that the predetermined time has been reached.

The first core and the directory may be configured to determine whether the predetermined time is reached by using a real-time counter (RTC) included in each of the first core and the directory.

The first core and the directory may include a deadline buffer configured to store information on a timepoint at which a timeout occurs and may be configured to determine whether the predetermined time is reached by comparing an RTC with time information stored in a first pointer of the deadline buffer.

The first core and the directory may each include an address buffer configured to store address information of the cache line, and in response to reaching the predetermined time, first core and the directory may be configured to change a state of the cache line of the directory to the Exclusive state and change a state of the cache line of the first core to the Invalid state, by referencing the address information of the cache line in the address buffer.

The deadline buffer may include information indicating a number of cache lines matching the information on a timepoint at which a timeout occurs.

After the state of the cache line is changed to the Invalid state, the deadline buffer may be configured to increase the first pointer of the deadline buffer by 1, and the address buffer may be configured to update a first pointer of the address buffer based on the information on a number of cache lines.

The first core and the directory may be configured to obtain initial RTC information corresponding to a timepoint at which a state of the cache line of the directory and a state of the cache line of the first core were changed into the Shared state and determine that the predetermined time has been reached in response to the initial RTC information satisfying a predetermined bit condition.

The first core and the directory may be configured to determine that the predetermined time has been reached in a case that a determined bit remains in a same state as the initial RTC information while another determined bit meets a determined condition.

In another general aspect, a method performed by a processor including a first processing unit and a second processing unit, the first processing unit including a first core and a first L1 cache used by the first core, and the second processing unit including a second core and a second L1 cache used by the second core, the first L1 cache having a first cache line that corresponds to a second cache line in the second L1 cache, the method including: initiating, by the first core, a state change of the first cache line, the initiating including specifying a timeout value in a request directed to the first cache line that is sent to a directory managing coherence between the first L1 cache and the second L1 cache, wherein the directory configures a state change that is to occur according to the timeout value, and wherein the first L1 cache configures a state change of the first cache line that is to occur according to the timeout value; based on the first request, sending, by the directory, to the second L1 cache, a second request specifying the second cache line, and, based thereon, the second L1 cache changes state of the second cache line and provides data from the second cache line to the first L1 cache; applying, by the first L1 cache, the provided data to the first cache line; and changing the state of the first cache line, by the first L1 cache, based on the timeout value.

Other features and aspects will be apparent from the following detailed description, the drawings, and the claims.

Figure 1:
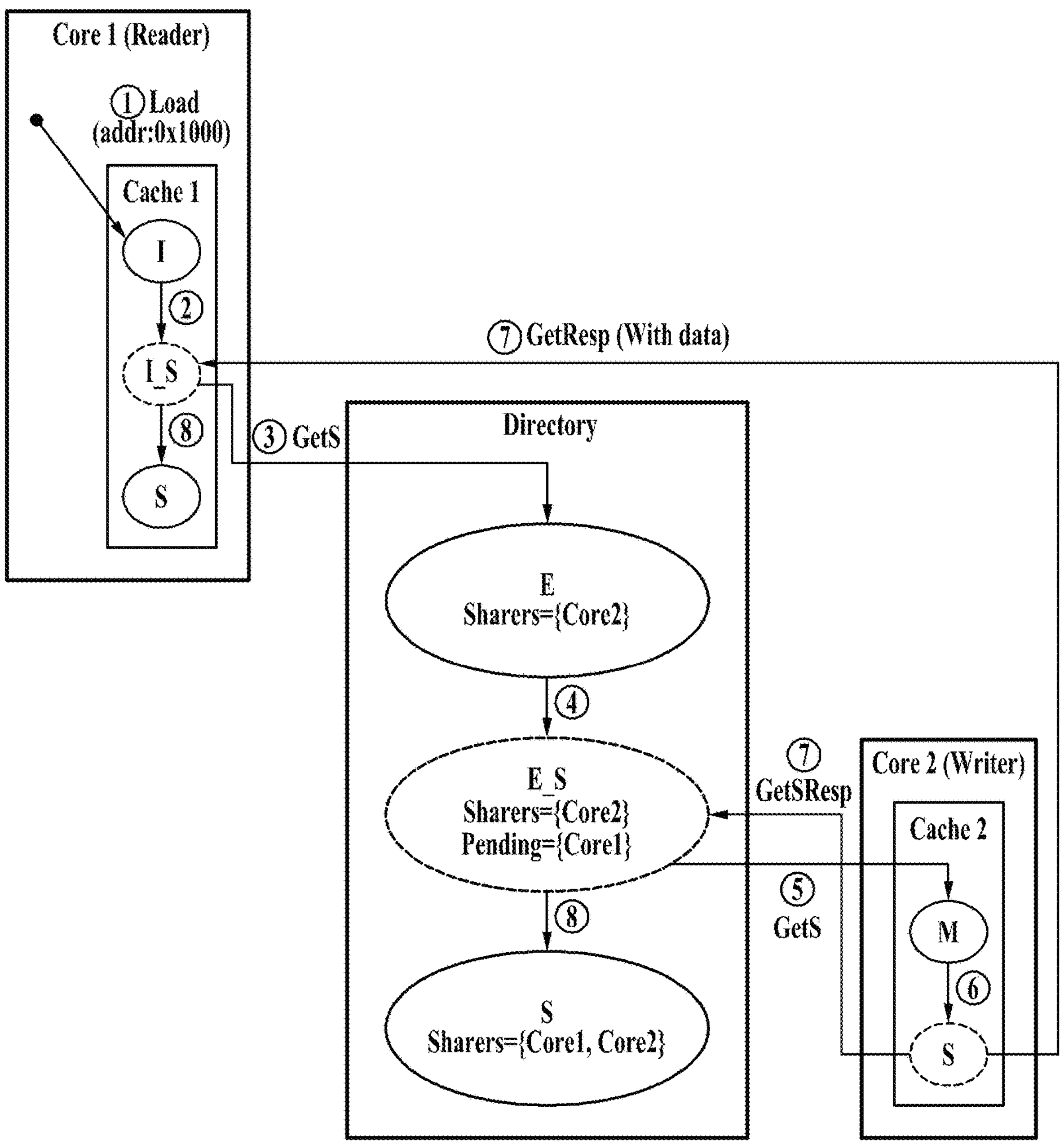
FIG. 1 illustrates an example of how a private cache of each core manages a state of a cache line in a modified exclusive shared and invalid (MESI) protocol, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of how a private cache of each core manages a state of a cache line in a MESI protocol, according to one or more embodiments.

The MESI protocol is a cache coherence management scheme for maintaining cache coherence in a multi-core processor. The MESI protocol is designed to maintain cache coherence even when instances of a piece of data with a same memory address are used in multiple cores at the same time (where each of the cores uses a different cache). The MESI protocol manages a state of each cache line by using four states, which are Modified (M), Exclusive (E), Shared (S), and Invalid (I). A cache line is a basic unit of data a cache memory. The size of a cache line may vary from system to system, but is typically 32 bytes, 64 bytes, or 128 bytes.

When a cache line of a specific core is in the Modified (M) state, this indicates that the cache line is currently being used only by that core (not stored in any other core's cache) and data that corresponding data stored in memory (e.g., main/host memory) differs from the value in the cache line. In other words, when a cache line of a specific core is in the Modified (M) state, other cores do not have that data, and data coherence is maintained only when the cache line is written back to the memory.

When a cache line of a specific core is in the Exclusive (E) state, it indicates that the cache line is being used only by that core (the data of the cache line is not used in any other core's cache) but that its data matches what is stored in host/main memory. In other words, when a cache line of a specific core is in the Exclusive (E) state, no other core has the cache line, only that core can read the data, and the data has not been modified in the cache line (the cache line is coherent with main/host memory).

When a cache line of a specific core is in the Shared (S) state, it indicates that the cache line is shared among multiple cores and all cores have the same data of the cache line in their caches. In this state, the data has not been modified and is identical to the corresponding value stored in memory. In the shared (S) state, multiple cores may perform a read operation simultaneously.

When a cache line of a specific core is in the Invalid (I) state, it indicates that the cache line is no longer valid and cannot be used by that core. In other words, when a cache line of a specific core is in the invalid (I) state, it indicates a state in which another core has modified corresponding data or the cache line is otherwise in an invalidated state.

More specifically, when a cache line is in the Invalid (I) state and a the cache line's core attempts to read the cache line, the core makes a GetS request on a bus through a read request (i.e., Load). A GetS request, which is sent to fetch data from a specific memory address in the Shared (S) state, is sent by a core requiring the data to a memory controller or a directory. Here, when another cache has a corresponding cache line, the data may be transmitted through the bus, and the cache line of the GetS-requesting core may be updated with the received value and its state converted to the Shared (S) state. When no other cache has the data of the GetS request, the data may be fetched from memory, and the updated cache line's state may be switched to the Exclusive (E) state. As described above, a read request to remedy a cache line in the Invalid (I) state may fetch data from another cache or from the main/host memory and change the state of the cache line to the Shared (S) state or the Exclusive (E) state, as the case may be. When a core's write request occurs on a cache line in the Invalid (I) state, a GetX request is issued to invalidate (set to Invalid (I)) any corresponding cache lines in any another caches, and the written-to cache line has its state changed to the Modified (M) state. During this process, when other caches have cache lines corresponding to the written-to cache line, invalidation thereof may occur after latest data is received. This ensures that while the core is writing data other cores do not modify or access the data.

In the Exclusive (E) state, a cache line exists only in the corresponding core and the cache line has not yet been modified. In this state, when the core makes a read request, the cache line may be used as-is without a separate bus transaction. However, when the core makes a write request (i.e., Store), the cache line is changed to the Modified (M)

state. The Exclusive (E) state ensures that data consistent with the memory is maintained and other cores do not modify that data, and no bus transaction is needed when reading or writing a cache line in the Exclusive (E) state.

The Shared (S) state indicates a situation in which multiple cores reference same data (e.g., a same variable), in which case any core may use its corresponding cache line as-is without a separate bus transaction when making a read request. However, when any core makes a write request, a GetX request is issued, and thus, corresponding cache lines existing in other cores are invalidated, and the state of the written-to cache line is changed to the Modified (M) state.

In the Modified (M) state, the cache line has been modified and the cache line does not exist in other cores. In this state, when a read or write request occurs, the cache line may be locally maintained or modified without a separate bus transaction. The Modified (M) state ensures/indicates that the data has been modified and is not shared with other cores.

The directory may track and manage the cache state of each core in a multi-core system. The directory may record in which cache of a core a specific cache line is stored and a state of the cache line. For example, when a first core sends a GetS request and a second core's corresponding cache line is in the Exclusive (E) state, the directory may convert the second core's corresponding cache line to the Shared (S) state and transmit the requested data to the first/requesting core. When a GetX request occurs in the Exclusive (E) state, the cache line may be changed to the Invalid (I) state, the existing data may be invalidated, and new data may be transferred to the requesting core. Note that in FIG. 1, E_S and I_S indicate transitions between states. Specifically, E_S refers to the transition from the Exclusive (E) state to the Shared (S) state, and I_S refers to the transition from the Invalid (I) state to the Shared (S) state.

An important part of this process is to, when a write request occurs on one core, invalidate all corresponding cache lines in the Shared (S) state that exist on any other cores. This task is referred to as invalidation. To perform invalidation in an N-core system, an invalidation request may need to be sent to at most N−1 cores, and an acknowledgment response (ACK) related to the request may need to be received. This is one of the main causes of performance degradation in a multi-core environment, because as the number of cores increases, traffic due to invalidation requests and acknowledgement responses increases exponentially.

In particular, in a symmetric multiprocessing (SMP) system, when one core makes a write request, an invalidation request and an acknowledgement response message may need to be sent to and received from all other cores. Thus, when the number of cores is N, the amount of resulting traffic that occurs may be at most N squared. This may be one of the factors that has a significant impact on system performance and is a reason why it is difficult to significantly increase the number of cores despite advances in semiconductor manufacturing processes. That is, although it has become possible to mount more cores on a single chip due to the advance in the semiconductor process, system expansion is limited due to such traffic issues.

State changes in the MESI protocol are important for maintaining cache coherence, but invalidation request and acknowledgement response traffic that especially occurs due to a write request has a negative impact on the scalability of multi-core systems.

Figure 2:
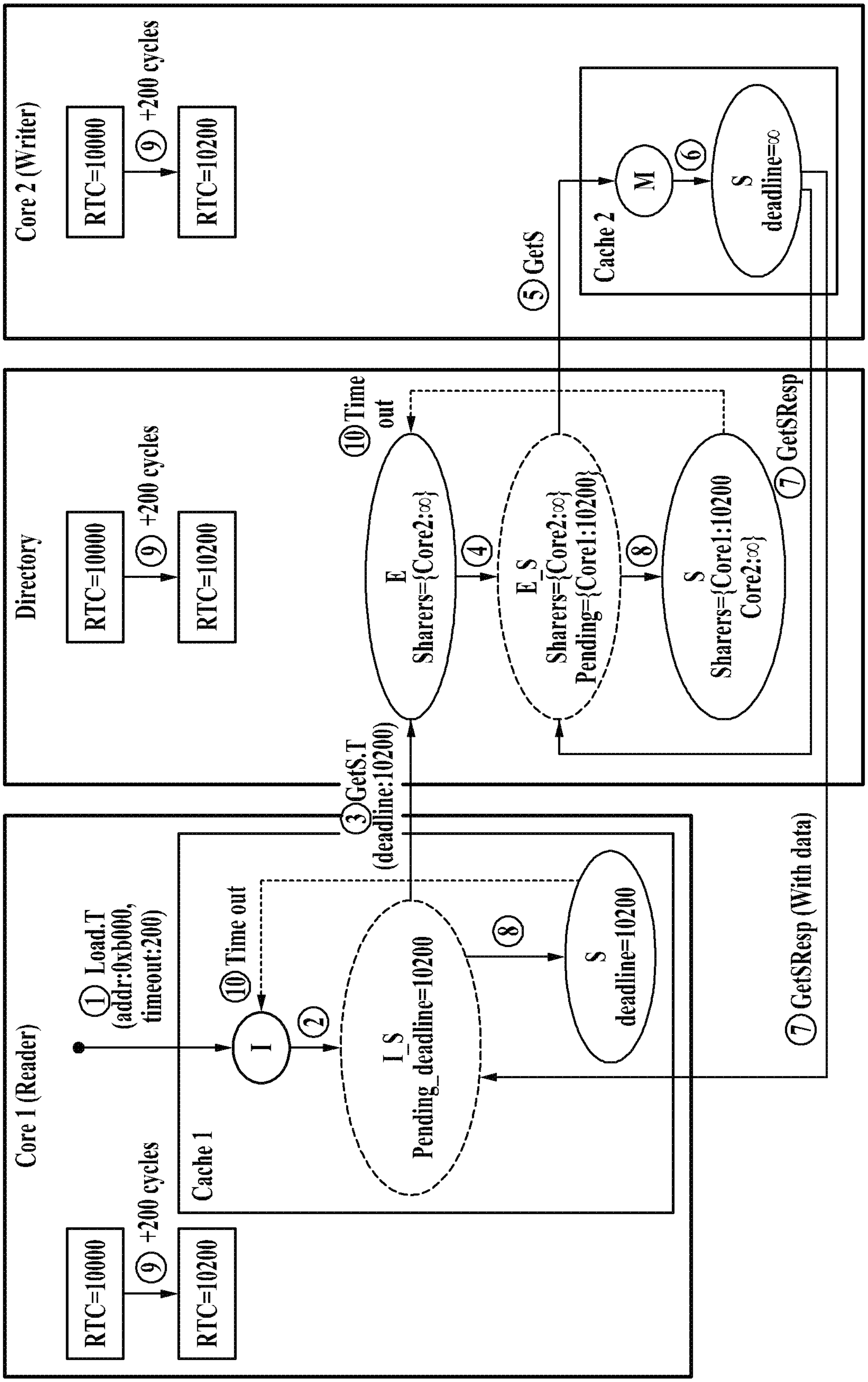
FIG. 2 illustrates an example of how a private cache of each core manages a state of a cache line in a protocol according to one or more embodiments.

FIG. 2 illustrates an example of how a private cache of each core manages a state of a cache line in a protocol according to one or more embodiments.

The protocol may be based on an existing protocol (e.g., the MESI protocol), but may add a timeout mechanism to manage cache coherence more efficiently. Hereinafter, the protocol may be referred to as a timeout protocol or a timeout MESI protocol. The protocol may use new instructions, Load. T and GetS. T, to automatically change a cache line from the Shared (S) state to the Invalid (I) state after a determined period of time.

A cache line may be managed in the Modified (M) state, the Exclusive (E) state, the Shared (S) state, and the Invalid (I) state, and by adding the Load. T and GetS.T instructions ("T" standing for "timeout"), the cache line may be voluntarily self-changed to the Invalid (I) state. For example, when the Load. T instruction is issued from a core to a cache, when a cache line of a primary cache is in the Invalid (I) state, a GetS.T request may be sent from the primary cache to a directory to obtain the Shared (S) state. When receiving a GetS.T request, the directory may look up a directory entry corresponding to the cache line. When only a secondary cache has a line in the Modified (M) or the Exclusive (E) state according to a result of the directory entry lookup, the GetS.T request may be forwarded to the secondary cache. When receiving the GetS.T request, the secondary cache may change the cache line to the Shared (S) state, send a GetSResp request including line data to a primary cache, and send a GetSResp request without data back to the directory. When receiving the GetSResp request, the primary cache may store the data in an empty cache line and put the cache line in the Shared (S) state, and may reserve a timeout included in the initial GetS.T request. Also, when receiving the GetSResp request, the directory may add the primary cache as a sharer in the directory entry and reserve the timeout included in the initial GetS.T request. When the timeout occurs, the cache line of the primary cache may be automatically switched to the Invalid (I) state, and the primary cache may be automatically removed from the sharer in the directory entry.

Thereafter, when the second core sends a Store instruction to the secondary cache, the secondary cache may check that the cache line is in the Shared (S) state and send a GetX request to the directory. The directory may receive a GetX request and look up a corresponding entry to confirm a sharer. Here, since the primary cache is automatically removed from the sharer by the timeout, the directory may efficiently work by sending the GetXResp request directly to the secondary cache without having to invalidate the line of the primary cache.

On the contrary, in the conventional MESI scheme, the primary cache may still be a sharer. In this case, the directory may first send a GetX request, which is an invalidation request, to the primary cache. When receiving a GetX instruction, the first cache may change the state of the cache line from Shared (S) to Invalid (I) and send a GetXResp request to the directory. When receiving the GetXResp request, the directory may remove the primary cache from the sharer of the entry and forward the GetXResp request to the secondary cache. When receiving the GetXResp request, the secondary cache may store the latest data forwarded with the Store instruction in the cache line and change the state of the cache line from Shared (S) to Modified (M).

The protocol according to an embodiment may be particularly useful when multiple cores simultaneously use a cache line in the Shared (S) state. After a determined period of time, the cache line may be automatically changed to the Invalid (I) state, replacing the conventional manual invalidation request. This may reduce unnecessary communication between the cores and significantly improve system performance. For example, in the conventional MESI protocol, when one core modifies a cache line, an invalidation request needs to be sent to all other cores. However, in the protocol according to an embodiment, this process may be omitted since the cache line may be automatically changed to the Invalid (I) state through a timeout.

Figure 3:
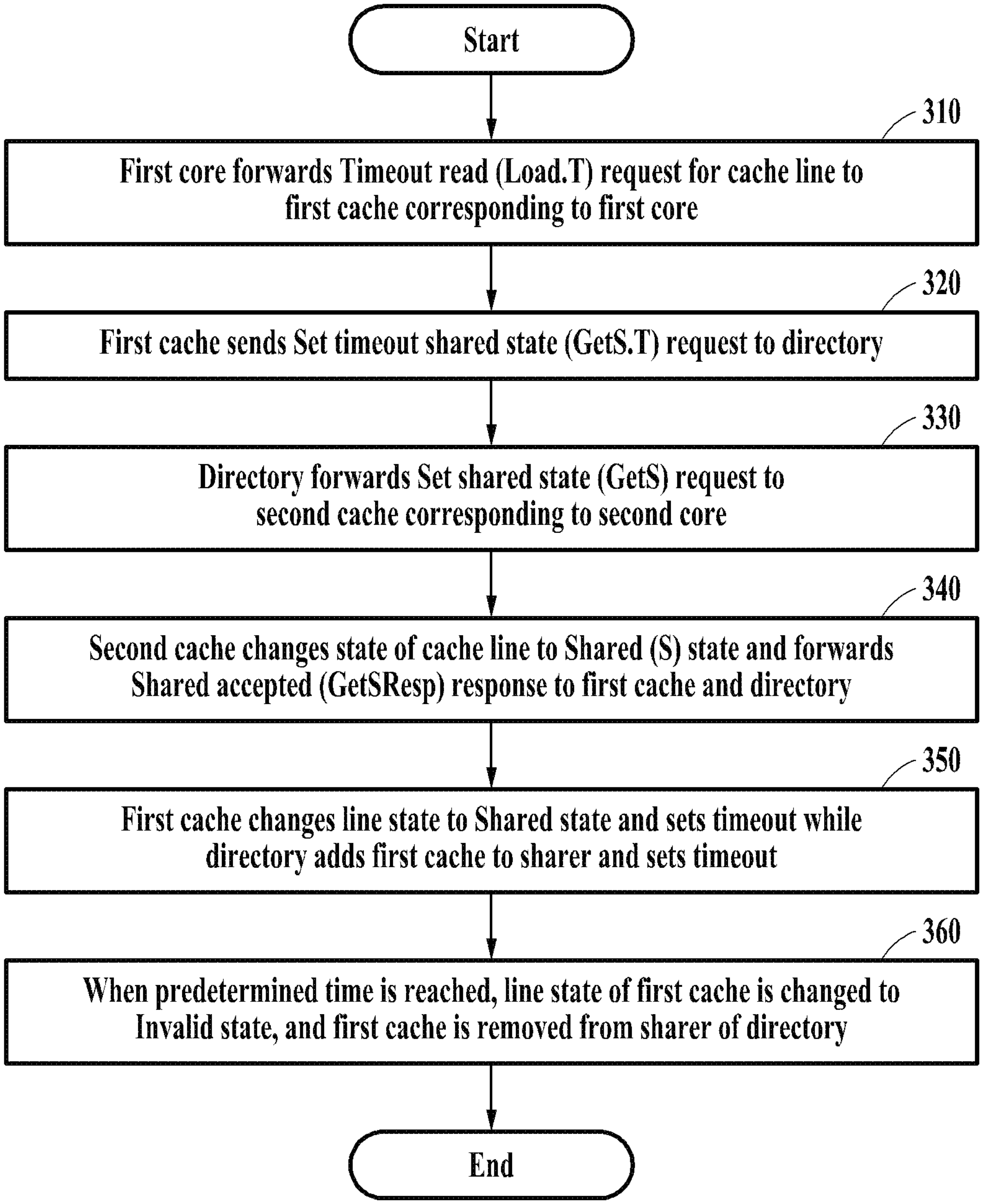
FIG. 3 illustrates an example of an operating method of a multi-core processor according to one or more embodiments.

FIG. 3 illustrates an example of an operating method of a multi-core processor according to one or more embodiments. The description provided with reference to FIG. 2 may also apply to FIG. 3.

The multi-core processor may be a high-performance processor having processing units integrated therein, and each processing unit may be composed of a core and a private cache (e.g., an L1 cache) connected to the core. The processing unit may support the core to operate independently, and may optimize memory access speed of its core by keeping its L1 cache close by to quickly process frequently used data.

Each processing unit may be a basic component that processes data and executes instructions in the multi-core processor and may function as a reading core and a writing core. A reading core reads data from a memory and performs operations, and a writing core modifies and stores data. A processing unit may function as a reading core (reader) to read data from the memory and process the data when performing a read operation, and may function as a writing core (writer) to modify data and store the data in a cache when performing a write operation. Through this flexible role switching, each processing unit may independently process read and write operations depending on the situation.

Although the read and write operations may be performed independently by each processing unit, a mechanism to maintain cache coherence may be needed when multiple cores share or modify data.

In particular, the private cache included in each processing unit may operate exclusively for the corresponding core and may store data (a cache line) that the core frequently accesses. Accordingly, the core may access the data much faster than reading the data directly from main memory.

The reading core and the writing core may operate based on the protocol, and it may be important to maintain cache coherence when multiple cores reference or modify the same data. For example, while a reading core is reading data stored in its private cache, another writing core may modify its locally cached version of that data. Here, the state of the cache line may be changed from the Shared (S) state to the Invalid (I) state, or from the Exclusive (E) state to the Modified (M) state, through the timeout MESI protocol.

In addition, an entire system may be configured to efficiently manage data while each processing unit operates independently. The reading core may quickly read data and perform operations, and the writing core may modify data and reflect the modified data in a cache. This structure may allow a multi-core processor to optimize parallel processing performance and may enable an operation of data sharing and synchronization between multiple cores to be performed smoothly.

Thus, a single processing unit may flexibly switch between roles of the reading core and the writing core depending on the situation and perform a high-performance operation while maintaining cache coherence in a multi-core environment.

Hereinafter, for ease of description, a processing unit that performs a read operation is referred to as a first processing unit, and a core and a private cache included in the first processing unit are referred to as a first core and a first cache, respectively. Similarly, a processing unit that performs a write operation is referred to as a second processing unit, and a core and a private cache included in the second processing unit are referred to as a second core and a second cache, respectively. Here, there may be one or more processing units (for the role of a reading core) that perform a read operation.

In operation 310, the first core may forward, to the first cache, a read request for a cache line. The read request may be a Timeout read request (Load. T request). Load. T is an instruction that indicates an operation of reading a cache line with a timeout setting. Since the cache line may be automatically invalidated by the timeout setting, cache coherence may be maintained, and unnecessary cache invalidation traffic may be reduced. For example, acknowledgments (ACKs) may be obviated, saving communication overhead.

In operation 320, the first cache may send a Set timeout-shared-state (GetS) request to a directory in response to the read request. The Set timeout-shared-state request may also be referred to as a Timeout request.

In operation 330, the directory may forward the Set timeout-hared-state (GetS) request to the second cache. In short, the Set timeout-shared-state (GetS) request is a request that the reading core forwards to the writing core via the directory.

In operation 340, the second cache may, in response to the Set timeout-shared-state (GetS) request, change the state of the cache line of the second core to the Shared (S) state and send a shared-accepted (GetSResp) response to both the first cache and the directory. The shared-accepted response may also be referred to as a Timeout-set response. The shared-accepted response sent to the first cache may include most recent data that the second cache line had.

In operation 350, the first cache may change the cache line state of the subject cache line to the Shared (S) state and set a timeout/timer (e.g., a real-time counter (RTC), discussed below) while the directory may add the first cache to the sharer and set its own timeout/timer. The directory and the first core may change the state of the cache line of the directory and the state of the cache line of the first core to the Shared (S) state, respectively. When GetSResp is received, the reading core may use the corresponding cache line in the Shared (S) state and read data with a timeout set.

In operation 360, when a predetermined time is reached (e.g., the timeout timer expires), the line state of the first cache may be changed to the Invalid (I) state, and the cache line in the first cache may be removed from the sharer of the directory. To elaborate, when the directory and the first core each reach the predetermined time, the directory may change the state of an entry to the Exclusive (E) state, and the first core may change the state of the cache line to the Invalid (I) state.

As described above, the timeout may refer to an operation in which the state of the directory and the state of the cache line of the first core are changed to the Exclusive (E) state and the Invalid (I) state, respectively, at a predetermined time by the Set timeout request, and the timepoint at which a timeout occurs may be referred to as a deadline. A cache line stored by the writing core may be read by multiple reading cores. Here, the reading cores and the directory may need to be able to determine that the corresponding cache line has reached the timeout timepoint (i.e., deadline) without needing inter-core communication. As described below, the multi-core processor may add a real time counter (RTC) within each core and directory that may track a passage of absolute time regardless of a clock frequency and may thus determine when the deadline is reached without requiring inter-core communication to do so.

Timeout setting may be automatically done by a hardware logic within the core. Each core may learn a pattern of using a cache for itself in real time and automatically set the timeout based on the learning. This approach is similar to a mechanism already used in a hardware prefetcher. Although the purpose is different, a similar logic may be applied to implement automatic timeout setting. Thus, automatic timeout setting may also be implemented in a manner of extending a hardware prefetcher.

Alternatively, a timeout may be set for a desired cache line address in software by adding a new instruction to an instruction set. For example, an instruction such as Load. T may be added to an existing Load instruction so that a timeout may be specified, or a separate instruction may be designed only to set a timeout for a specific address. Such instructions may be used explicitly by a programmer and may also be automatically added to a binary by a compiler to optimize a program.

Figure 4:
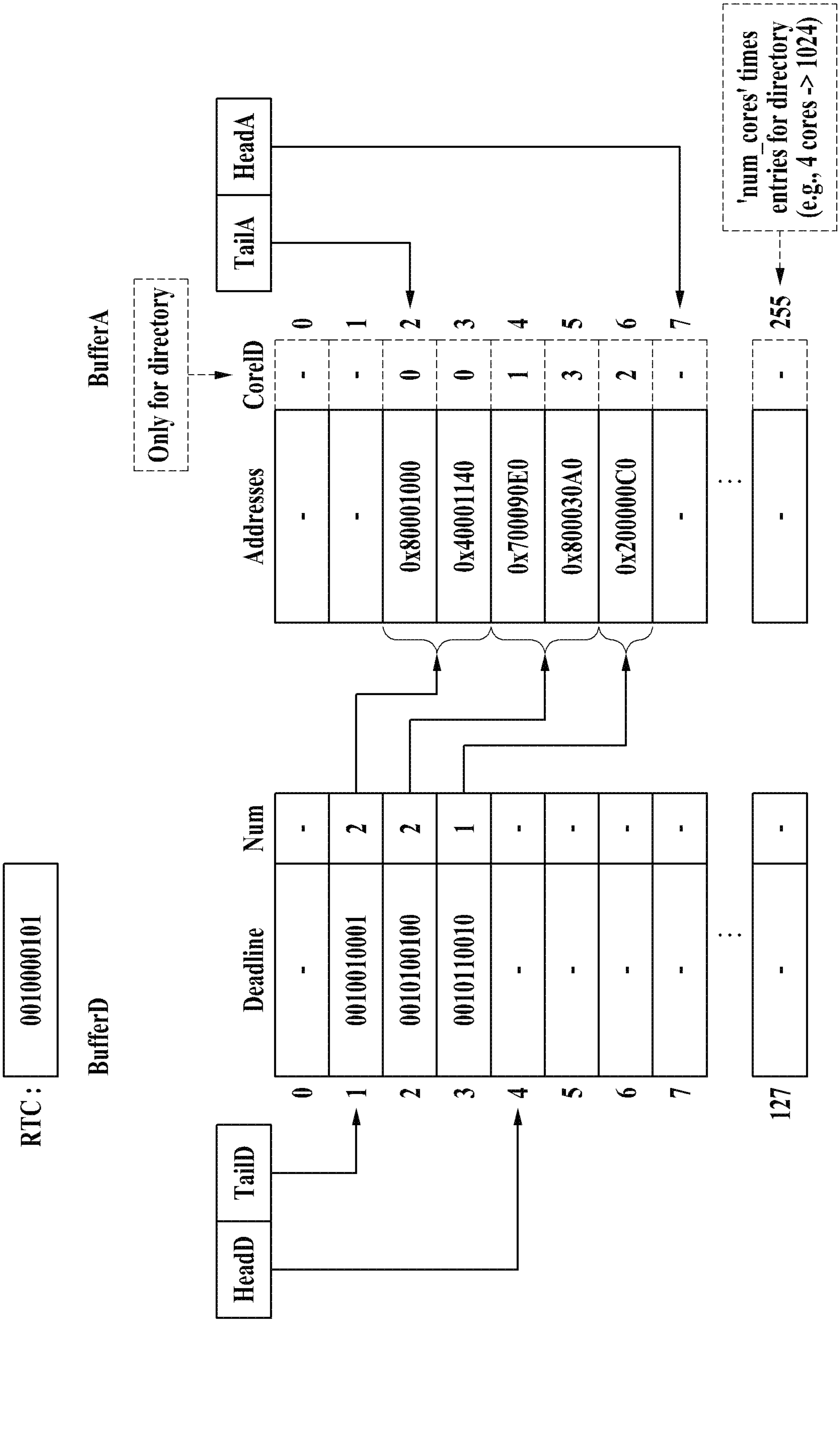
FIG. 4 illustrates an example of a structure and an operation of a deadline buffer and an address buffer, according to one or more embodiments.

FIG. 4 illustrates an example of a structure and an operation of a deadline buffer and an address buffer, according to one or more embodiments. The description provided with reference to FIGS. 2 and 3 is generally applicable to FIG. 4.

Referring to FIG. 4, a deadline buffer (which may be referred to as BufferD) according to some embodiments may store a deadline of each cache line and a number of cache lines matching the deadline. An address buffer (which may be referred to as BufferA) according to some embodiments may store address information of an individual cache line. The deadline buffer and the address buffer may be circular buffers; a tail pointer (Tail) and a head pointer (Head) may be used for management thereof. The tail pointer and the head pointer of the deadline buffer may be referred to as TailD and HeadD, respectively, and the tail pointer and the head pointer of the address buffer may be referred to as TailA and HeadA, respectively.

The head pointer may point to a location in a buffer to which new data is added. In a circular buffer structure, the head pointer may increase whenever new data comes in. When the head pointer reaches an end of the buffer, by the circular structure, the head pointer may roll back to the beginning of the buffer. Since the head pointer always points to the location in which new data is to be written, when adding data, the data may be inserted at the location pointed to by the head pointer. The tail pointer points to oldest data in the buffer, which may be removed or read. The tail pointer increases whenever data is deleted, and likewise, when the tail pointer reaches the end of the circular buffer, the tail pointer rolls back to the beginning of the buffer. The tail pointer points to a location from which data may be read or deleted. When data is removed from the buffer, the tail pointer may move to next data/entry in the buffer.

When the buffer is empty the head pointer and the tail pointer are at a same location. When the buffer is full, the head pointer is positioned immediately before the tail pointer (i.e., the head pointer points to a location immediately after the tail pointer). Hereinafter, the tail pointer may be referred to as a first pointer, and the head pointer may be referred to as a second pointer. The number of entries of the address buffer is greater than the number of entries of the deadline buffer. For example, in the example of FIG. 5, the deadline buffer may consist of 128 entries, and the address buffer may consist of 256 entries. However, the number of entries in the deadline buffer and the address buffer is not limited to the examples described above.

The deadline buffer and the address buffer may manage interrelated data. More than one address may be associated with each deadline, and a Num field of the deadline buffer stores a number of addresses waiting for a corresponding deadline (i.e., each deadline buffer entry may have a Num of associated address entries). When the Num field of the deadline buffer is N-bits, one deadline may have up to 1 to $2^N$ addresses associated therewith. Which entries in the address buffer are associated with which entries in the deadline buffer may be determined based on the order of the deadline buffer entries, the numbers Num of the deadline buffer entries. The address buffer entries may be in groups of one or more, and each group's order/position corresponds with the order/position of the corresponding deadline buffer entry.

The deadline buffer may manage the deadline at which a timeout occurs, and the address buffer may store the address information of the cache line, to manage a time until each cache line times out. For example, a timeout may occur as the RTC independently increases. The current value of the RTC may be repeatedly compared to the deadline value located at the tail pointer of the deadline buffer, and when a timeout occurs (e.g., the current RTC value reaches/matches the deadline indicated in the tail of the deadline buffer), the data of the address(es) in the address buffer that correspond to the timed-out deadline may be used, and when necessary, a timeout request for the cache line (for example, changing a state of a cache line of a reading core to the Invalid state, changing a state of a cache line of a directory to the Exclusive state, or the like) may be transmitted. Concluding this process, the tail pointer of each buffer may increase by one, thus rolling the timed-out data from the circular buffers; a next timeout is then waited for.

Each core, and the directory, may have their own deadline buffer and address buffer, and in particular, for the directory, a core identification (CoreID) field may further be managed in the address buffer. The core identification field may be used to determine which core owns a given address, allowing for coherent cache management even in an environment in which each processing unit operates independently.

In addition, the deadline buffer and the address buffer of the directory may need to manage deadline and address information of multiple cores and may thus be designed to be larger in size than the deadline buffer and the address buffer of the core. The deadline buffer and the address buffer of the directory may need to be large enough to accommodate buffers of all cores. Otherwise, there may be cases in which the address buffer of the core is sufficient but the address buffer of the directory is insufficient. In this case, Load. T may be demoted to a normal Load. Alternatively, a number of rows of the deadline buffer and the address buffer of the directory may be set to a sum of a number of rows of the deadline buffer and the address buffer of the core. In this case, however, a size of the deadline buffer and the address buffer of the directory may increase as a number of cores increases. In contrast, the deadline-address buffer pairs of the respective cores are only concerned with local addresses and therefore do not need a coreID in their address buffers. Moreover, because it is possible for a core to have multiple local addresses associated with a same local deadline, the Num field may still be present and used.

Figure 5:
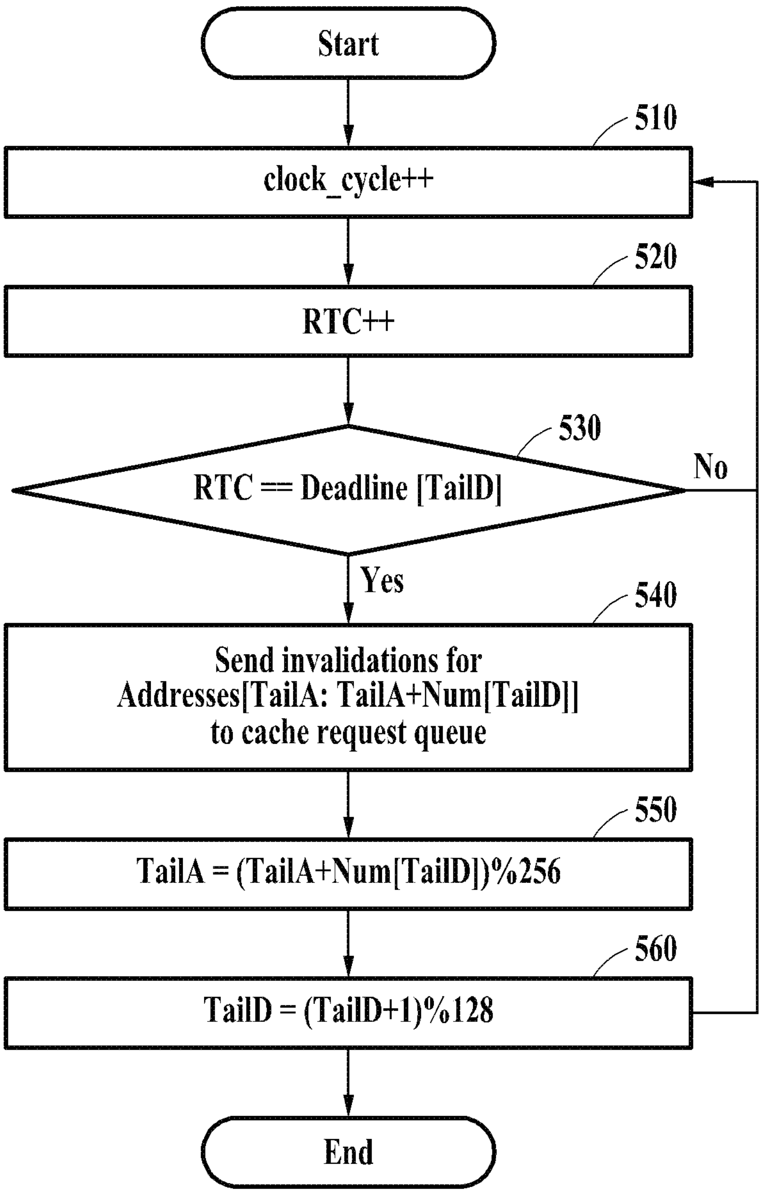
FIG. 5 illustrates an example of a method of removing a timed-out cache line from a cache and a directory, according to one or more embodiments.

FIG. 5 illustrates a an example of a method of removing a timed-out cache line from a cache and a directory. The description provided with reference to FIGS. 2 to 4 is generally applicable to FIG. 5.

For ease of description, operations 510 to 560 are described as being performed using a multi-core processor system including a cache coherence maintenance mechanism which operates in a multi-core processor thereof. Specifically, the multi-core processor system may include modules (e.g., circuitry and/or code (e.g., microcode, compiled machine code, etc.) that manage an operation of performing cache line invalidation based on timeout, and the modules may include a cache, a directory, an RTC, a deadline buffer (or BufferD), and an address buffer (or BufferA).

That is, the multi-core processor system (hereinafter, referred to as a system) may be an integrated structure of hardware and software that enables each core and cache to coherently process data in the multi-core processor. The structure may include a cache coherence management module and a directory module that manage operation of individual cores and maintain cache coherence and may also include a private cache equipped on each core and a controller that manages the private cache. However, operations 510 to 560 may also be performed by another suitable electronic device in a suitable system.

When a timeout occurs while one cache line in a reading core is in the Shared state, the system may recognize the timeout and take action to invalidate the cache line.

First, the system may increase its clock by a clock cycle in operation 510, and accordingly, the RTC may also increase in operation 520. For example, an initial RTC value may be assumed to be 0010000101. This value may increase by one over time, matching the clock cycle and may thus be, for example, 0010000110, 0010000111, etc. During this process, the system may compare the deadline value referenced by the tail pointer (TailD) of the deadline buffer with the current RTC value in operation 530. For example, when the value pointed to by the tail pointer (TailD) of the deadline buffer is 0010000111, a comparison operation may continue until the RTC reaches this value.

When the RTC value matches the deadline value (e.g., 0010000111=0010000111), the system recognizes that the corresponding cache is to be invalidated. The system refers to the address pointed to by the tail pointer (TailA) of the address buffer and retrieves "n" addresses from that address in operation 540; "n" being the value in Num[TailD]. Num[TailD] indicates a Num field value pointed to by the tail pointer of the deadline buffer. For example, when a Num[TailD] value is 2, the system may retrieve a first address and a next address pointed to by the TailA pointer.

The system may forward an invalidation request for these addresses to a cache request queue, from which cache requests are executed. For example, when the first address stored in the address buffer is 0x80000100 and the second address stored in the address buffer is 0x80000140, these two addresses may be an invalidation target. The cache request queue may hold requests for the cache, and the system may invalidate corresponding cache lines by using the queue. In the case of the directory, which also has its own cache request queue, CoreIDs may be forwarded with the respective addresses of the requests, and the corresponding core identification (CoreID) information may be removed from a sharer list managed by the directory (the sharer list indicating which cores are sharing a given address). For example, when a processing unit with CoreID 3 holds the corresponding cache line, an ID of that core (or processing unit) may be removed from the sharer list of that address. The sharer list may represent a set of all cores that maintain a specific cache line in the Shared (S) state. By utilizing the sharer list, the directory can send invalidation requests to all cores sharing the cache line when a particular core sends a GetX request. The sharer list allows the directory to find the second cache when the first cache sends a request to the directory. That is, when the directory receives a request from the first cache, it references the sharer list to identify other caches (e.g., a second cache) that hold the same data. For example, if the first cache sends a GetS. T request, the directory checks the sharer list and forwards the GetS.T request to the second cache, which previously held the data in the Exclusive (E) state. The sharer list may be managed directly by the directory. That is, the sharer list maintains information about the cores sharing a specific cache line, and the directory uses this information to manage the sharers.

Then, the system may update the tail pointers. First, the tail pointer of the address buffer may be updated by adding a current TailA value to the Num[TailD] value and performing a modulo operation with 256 in operation 550 (the circular buffer logic). For example, when the TailA value is 100 and the Num[TailD] value is 2, a new TailA value may be (100+2) % 256=102. Through this process, a new address to reference at a next timeout may be specified. Similarly, the tail pointer (TailD) of the deadline buffer may also be set to point to a next deadline item via an operation of (TailD+1) % 128 in operation 560. For example, when a current TailD value is 3, a new TailD value may be 4. By repeating this process, the system may perform a task of removing the corresponding cache line from the cache and the directory whenever a timeout occurs.

Figure 6:
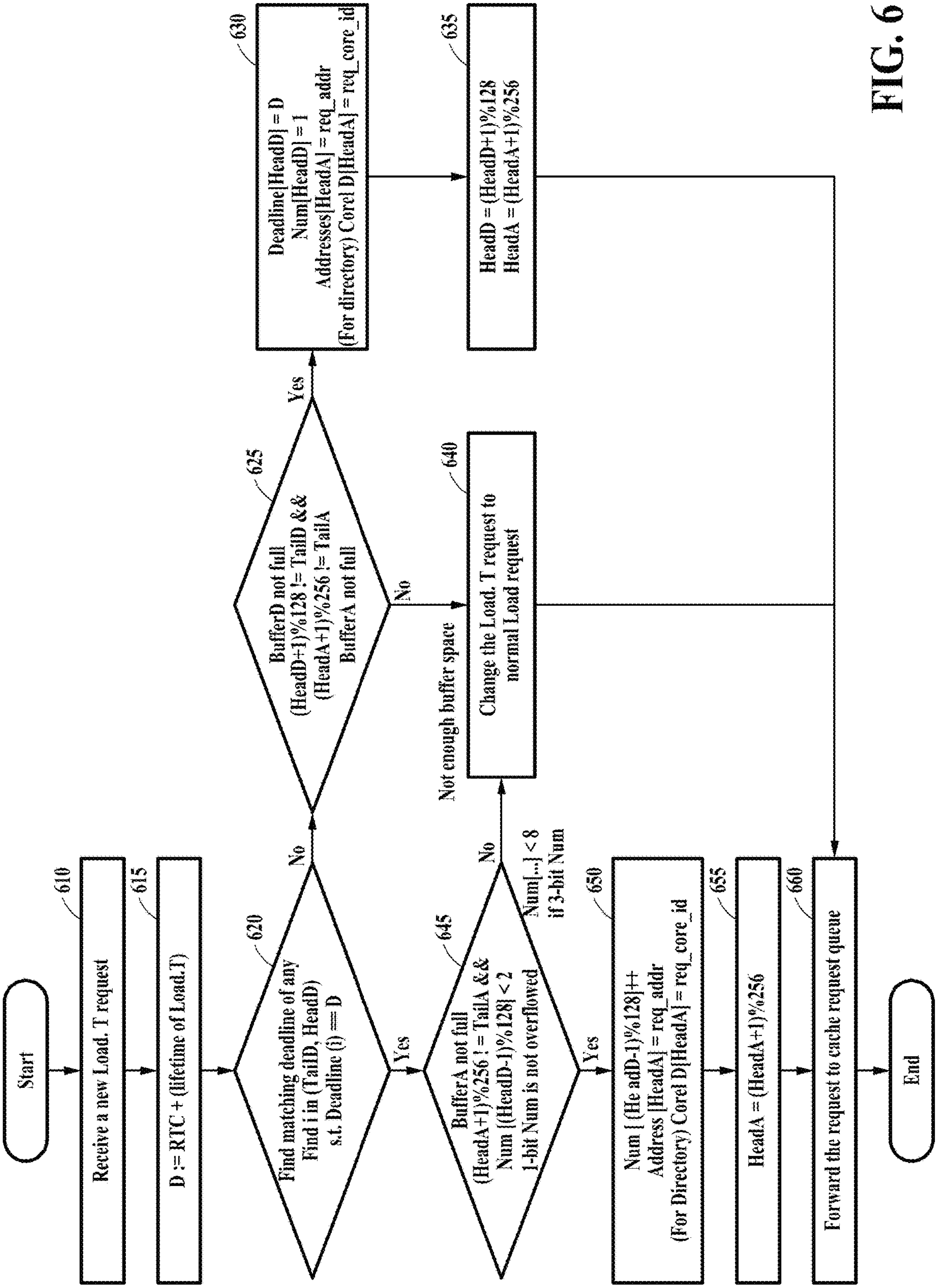
FIG. 6 illustrates an example of a method of accepting a new Load. T request, according to one or more embodiments.

FIG. 6 illustrates an example of a method of accepting a new Load. T request, according to one or more embodiments. The description provided with reference to FIGS. 2 to 5 is generally applicable to FIG. 6.

In operation 610, a system according to one or more embodiments may receive a new Load. T request. The Load. T request is an instruction that indicates an operation of reading cache data with a timeout setting. Subsequently, in operation 615, the system may add (i) a lifetime/duration of the Load.T instruction to (ii) a current RTC value to calculate a timeout time (in terms of the RTC) of the request, which is added as a new deadline (D).

In operation 620, it may be checked whether an address of the new Load. T request may be merged with a previously added deadline. To do this, the system may first find out whether there is a position i, among valid entry positions in a deadline buffer, which has a same value as the deadline (D). Here, valid entries are those only from TailD to before HeadD. When it is determined that there is, the system may determine that an already registered deadline is being used and process as such, and may proceed to operation 645. When it is determined that there is not, a new deadline may need to be registered and the system may proceed to operation 625 to check whether a buffer space is sufficient.

In operation 625, it may be checked whether there is a sufficient space in the deadline buffer and an address buffer. When there is no sufficient space, the Load. T request may be changed to a normal Load request in operation 640. On the other hand, when a sufficient space is secured, the system may proceed to operation 630 to store a new deadline and Num field value in the deadline buffer of the requesting core and store an address value in the address buffer of the requesting core. In addition, for the directory, core identification (CoreID) information may also be stored in its deadline buffer and address buffer.

In operation 635, registration of a new entry may be prepared by increasing a head pointer of the deadline buffer and a head pointer of the address buffer, respectively (e.g., in each of the requesting core and the directory). Here, the head pointer of the deadline buffer and the head pointer of the address buffer may be processed through a modulo operation according to respective buffer sizes. For example, HeadD may be updated to (HeadD+1)%128, and HeadA may be updated to (HeadA+1)%256.

In operation 645, when a condition for sharing a same deadline is established (i.e., the deadline computed at operation 615 is already in the deadline buffer), data may be added to the head pointer of the deadline buffer and the head pointer of the address buffer, and the Num field value may be increased (reflecting the additional address becoming associated with the deadline). In this case, a maximum value limit condition may be checked to prevent the Num field value from increasing excessively. For example, the Num field value may be allowed up to 2, and when this value is exceeded, the corresponding Load. T request may be changed back to a normal Load request in operation 640.

In operation 650, the Num field value may be increased, and address information and the core identification (CoreID) information (in the case of the directory's buffers) may each be added to the address buffer. Subsequently, the head pointer of the address buffer may be increased in operation 655, and in operation 660, the corresponding request may be forwarded to the cache request queue to start processing.

Figure 7:
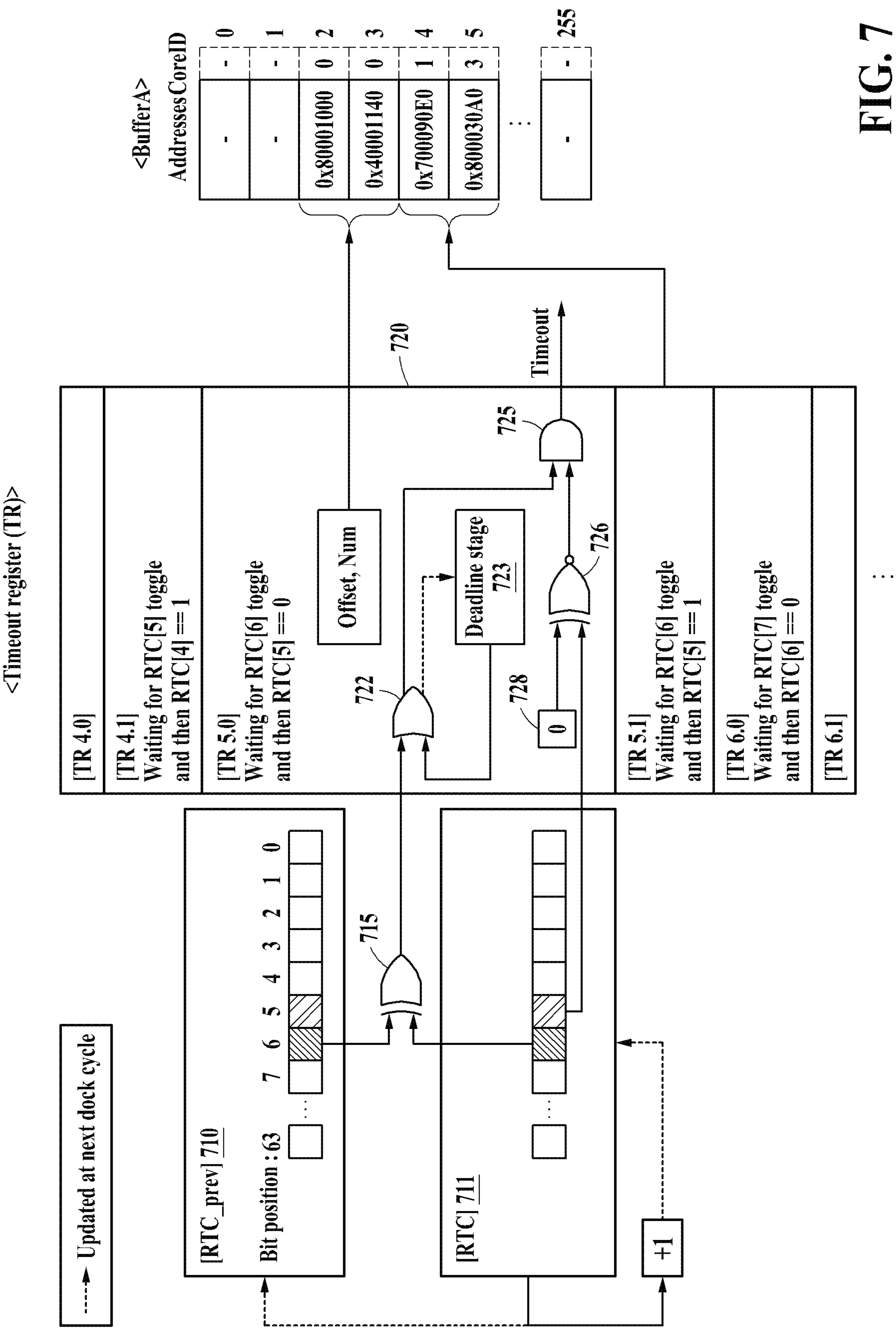
FIG. 7 illustrates an example of a mechanism by which a timeout occurs at a timepoint when a specific bit of a real time counter (RTC) is set to meet a condition, according to one or more embodiments.

FIG. 7 illustrates an example of a mechanism by which a timeout occurs at a timepoint when a specific bit of an RTC is set to meet a condition, according to one or more embodiments. The description provided with reference to FIGS. 2 to 6 is generally applicable to FIG. 7.

A lifespan of a cache line that is read with the Load. T instruction may typically be only a few tens to tens of thousands of clock cycles. However, since the RTC may last 264 cycles, there is a disadvantage in that the deadline value stored in the deadline buffer may also need to be 64 bits in size. Referring to FIG. 7, the above issue may be resolved by applying a method of generating a timeout by using a specific bit of the RTC.

For example, an initial RTC value at a timepoint that a cache line enters the Shared (S) state may be assumed to be b'01010000 (here, b represents the prefix of the more-significant bits of the RTC value). A timeout point may be set as a first timepoint at which the 6th least-significant bit of the RTC is inverted (1→0) and the 5th bit of the RTC becomes equal to the initial RTC value as time passes. In this case, a difference between the two values may be 128−80=48 cycles, and a timeout may occur after a total of 48 cycles. The number of cycles to take to the timeout may vary depending on the initial RTC value but may be guaranteed to be greater than at least 25=32 cycles and less than or equal to 26=64 cycles. When bit positions to be observed are increased by 1 and set to the 7th bit and the 6th bit, it may take more than 64 and less than or equal to 128 cycles to reach the timeout.

To generalize this mathematically, the deadline may be defined as a first timepoint at which an i+1-th bit is inverted and an i-th bit becomes equal to the initial RTC value. To express an N-bit binary number in a polynomial form, it may be expressed as Equation 1 below.

$$b_k \in \{0, 1\} \text{ for } k = 0 \sim (N-1) \qquad \text{Equation 1}$$

An initial N-bit RTC value may be defined as I as shown in Equation 2 below.

$$I = b_{N-1}2^{N-1} + \ldots + b_{i+1}2^{i+1} + b_i 2^i + \ldots + b_0 2^0 \qquad \text{Equation 2}$$

A deadline value D may be expressed as Equation 3 below.

$$D = b_{N-1}2^{N-1} + \ldots + (b_{i+1} + 1)2^{i+1} + b_i 2^i \qquad \text{Equation 3}$$

Here, the RTC increases by 1 at every cycle. The first moment at which the i+1-th bit is inverted may be when 1 is added to this bit, and here, all bits before the i-th bit may be 0. When an initial value of the i-th bit is 0, it may be determined that the deadline has already been reached, otherwise the RTC may need to increase by 1 until only the i-th bit is 1. Thus, in either case, the deadline may be defined as in Equation 3.

$$m = b_{N-1}2^{N-1} + \ldots + b_{i+1}2^{i+1} + b_i 2^i \qquad \text{Equation 4}$$

$$M = b_{N-1}2^{N-1} + \ldots + b_{i+1}2^{i+1} + b_i 2^i + 2^i - 1 \qquad \text{Equation 5}$$

Since multiple initial values may have a same deadline, a minimum value and a maximum value of an initial value may be calculated as in Equations 4 and 5, respectively. The minimum value may be a case in which all bits before an i−1-th bit are 0, and the maximum value may be a case in which all bits before the i−1-th bit are 1.

$$D - M = 2^i + 1 \qquad \text{Equation 6}$$

$$D - m = 2^i + 1 \qquad \text{Equation 7}$$

Referring to Equations 6 and 7, a minimum cycle to reach the deadline may be calculated as $2^i+1$, and a maximum cycle to reach the deadline may be calculated as $2^{i+1}$. When simply setting the deadline as a point at which the i-th bit is inverted, an issue may arise in that the deadline may be reached in just one cycle depending on the initial RTC value. To resolve this issue, a condition for the i+1-th bit to be inverted and for the i-th bit to be maintained may be set in the above manner.

Through this mechanism, a possible range of i may be typically set to between 5 and 20. For example, when i=5, it may take 33 to 64 cycles to reach the timeout, and when i=20, it may take 1,048,577 to 2,097, 152 cycles (approximately 1 to 2 million cycles) to reach the timeout. Since a possible number of cases for i may be 16, the bit size for storing it may be as small as about log 2 16=4 bits. Thus, the Load. T instruction may easily set the timeout by specifying an i value together with an address to load.

A timeout register may store information indicating that the timeout point may be set as a timepoint at which a specific bit is inverted and another bit becomes equal to the initial RTC value. For example, a timeout register (TR 5.0) 720 may contain information that the timeout point has been set as the first timepoint at which the 6th bit is inverted and the 5th bit remains equal to the initial RTC value (e.g., 0). There may be multiple timeout registers.

RTC_prev 710 may store a previous cycle value of an RTC 711, which is an RTC of the current moment, and may be updated every cycle. That is, the RTC_prev 710 may store an RTC value of a previous cycle, and the RTC 711 may have a value increased by 1 in a next cycle.

In this way, a difference between the RTC_prev 710 and the RTC 711 may be checked and it may be determined through the difference whether a timeout condition has been met. For example, the RTC 711 and the RTC_prev 710 may be used to detect the timepoint when a 6th bit of a current RTC is inverted, and a comparison between the two registers may be performed via an XOR gate 715. When the 6th bit is inverted, the XOR gate 715 outputs 1.

In addition, the timeout condition may be the timepoint when the 5th bit remains equal to the initial RTC value. For this purpose, a NOT XOR gate 726 may compare a value (e.g., 0) stored in an initial value storage register 728 with the 5th bit value of the RTC 711. When the two values are equal, the NOT XOR gate 726 outputs 1.

A deadline stage 723 may be a status register for managing a status of a timeout mechanism. An initial status of 0 may indicate that the 6th bit has not yet been inverted, and a status of 1 may indicate that the 6th bit has been inverted in the past. A value of an OR gate 722 may remain as 1 when the 6th bit has been inverted at the current moment or previously. Hard wire 728 represents a fixed value of 0 and may be applied as an input to the NOT XOR gate 726 to check whether the 5th bit value is 0. An AND gate 725 may lastly determine whether a timeout has occurred because the 6th bit has been inverted and the 5th bit has become equal to the initial value 0. When a timeout occurs, it may be possible to access an entry stored in an address buffer (BufferA) by using stored Offset and Num field values.

When the number of positions of i to be observed is 16, from i=5 to 20, the timeout register may be a total of 32, including TR5.0, TR5.1, . . . . TR20.0, and TR20.1. The hard wire 728 may be 0 for the TR 5.0 720 but may be set to 1 for TR5.1.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be permanently or temporarily embodied in any type of machine, component, physical or virtual equipment, or computer storage medium or device, or in a propagated signal wave for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

The computing apparatuses, the electronic devices, the processors, the memories, the information output system and hardware, the storage devices, and other apparatuses, devices, units, modules, and components described herein with respect to FIGS. 1-7 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as a multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An operating method of a multi-core processor comprised of a first core and a second core, the operating method comprising:

forwarding, by the first core, a read request for a cache line to a first cache corresponding to the first core;

forwarding, by the first cache, a Set-timeout shared-state request to a directory, in response to the read request;

forwarding, by the directory, the Set-timeout shared-state request to a second cache corresponding to the second core;

in response to the Set-timeout shared-state request, changing a state of the cache line of the second core to a Shared state and forwarding, by the second cache, a Shared-accepted response to the first cache and the directory;

changing a state of the cache line of the directory and a state of the cache line of the first core to the Shared state; and performing a timeout, and in response to the timeout reaching a predetermined time, changing a state of the cache line of the directory and a state of the cache line of the first core.

2. The operating method of claim 1, wherein the performing of the timeout comprises:

determining, by each of the first core and the directory, whether the predetermined time is reached; and changing a state of the cache line of the directory to an Exclusive state and changing a state of the cache line of the first core to an Invalid state, based on a determination that the predetermined time has been reached.

3. The operating method of claim 2, wherein the determining of whether the predetermined time is reached comprises:

using a real-time counter (RTC) included in each of the first core and the directory.

4. The operating method of claim 2, wherein the first core and the directory each comprise:

a deadline buffer configured to store information on a timepoint at which a timeout occurs, and the determining of whether the predetermined time is reached comprises:

comparing an RTC with time information stored in a first pointer of the deadline buffer.

5. The operating method of claim 4, wherein the first core and the directory each comprise:

an address buffer configured to store address information of the cache line, and the performing of the timeout comprises:

in response to reaching the predetermined time, changing a state of the cache line of the directory to the Exclusive state and changing a state of the cache line of the first core to the Invalid state, by referencing the address information of the cache line in the address buffer.

6. The operating method of claim 5, wherein the deadline buffer comprises:

information indicating a number of cache lines matching the information on a timepoint at which a timeout occurs.

7. The operating method of claim 6, comprising, after the state of the cache line is changed to the Invalid state:

increasing the first pointer of the deadline buffer by 1; and updating a first pointer of the address buffer based on the information indicating a number of cache lines.

8. The operating method of claim 3, wherein the determining of whether the predetermined time is reached comprises:

obtaining initial RTC information corresponding to a timepoint at which a state of the cache line of the directory and a state of the cache line of the first core were changed into the Shared state; and determining that the predetermined time has been reached in response to the initial RTC information satisfying a predetermined bit condition.

9. The operating method of claim 8, wherein the determining that the predetermined time has been reached occurs in a case where a determined bit remains in a same state as the initial RTC information while another determined bit meets a determined condition.

10. A non-transitory computer-readable storage medium storing instructions that, when executed by a processor, cause the processor to perform the method of claim 1.

11. A multi-core processor comprising:

a first processing unit comprising a first core and a corresponding first cache;

a second processing unit comprising a second core and a corresponding second cache; and a directory, wherein the first core is configured to forward a read request for a cache line to the first cache;

wherein the first cache is configured to forward a Set-timeout request to the directory, in response to the read request;

wherein the directory is configured to forward the Set-timeout request to the second cache;

wherein the second cache is configured to, in response to the Set-timeout request, change a state of the cache line of the second core to a Shared state and forward a Set-timeout response to the first cache and to the directory;

wherein the directory is configured to change a state of the cache line of the directory to the Shared state;

wherein the first core is configured to change a state of the cache line of the first core to the Shared state; and wherein the directory and the first core are configured to perform a timeout, and in response to reaching a predetermined time, change a state of the cache line.

12. The multi-core processor of claim 11, wherein the first core and the directory are configured to:

each determine whether the predetermined time is reached; and change a state of the cache line of the directory to an Exclusive state and change a state of the cache line of the first core to an Invalid state, based on a determination that the predetermined time has been reached.

13. The multi-core processor of claim 12, wherein the first core and the directory are configured to:

determine whether the predetermined time is reached by using a real-time counter (RTC) included in each of the first core and the directory.

14. The multi-core processor of claim 12, wherein the first core and the directory each comprise a deadline buffer configured to store information on a timepoint at which a timeout occurs, and wherein the first core and the directory are configured to determine whether the predetermined time is reached by comparing an RTC with time information stored in a first pointer of the deadline buffer.

15. The multi-core processor of claim 14, wherein the first core and the directory each comprise an address buffer configured to store address information of the cache line, and in response to reaching the predetermined time, the first core and the directory are configured to change a state of the cache line of the directory to the Exclusive state and change a state of the cache line of the first core to the Invalid state, by referencing the address information of the cache line in the address buffer.

16. The multi-core processor of claim 15, wherein the deadline buffer comprises:

information indicating a number of cache lines matching the information on a timepoint at which a timeout occurs.

17. The multi-core processor of claim 16, wherein, after the state of the cache line is changed to the Invalid state, the deadline buffer is configured to:

increase the first pointer of the deadline buffer by 1, and the address buffer is configured to:

update a first pointer of the address buffer based on the information on a number of cache lines.

18. The multi-core processor of claim 13, wherein the first core and the directory are configured to:

obtain initial RTC information corresponding to a time-point at which a state of the cache line of the directory and a state of the cache line of the first core were changed into the Shared state; and determine that the predetermined time has been reached in response to the initial RTC information satisfying a predetermined bit condition.

19. The multi-core processor of claim 18, wherein the first core and the directory are configured to:

determine that the predetermined time has been reached in a case where a determined bit remains in a same state as the initial RTC information while another determined bit meets a determined condition.

20. A method performed by a processor comprising a first processing unit and a second processing unit, the first processing unit comprising a first core and a first L1 cache used by the first core, and the second processing unit comprising a second core and a second L1 cache used by the second core, the first L1 cache having a first cache line that corresponds to a second cache line in the second L1 cache, the method comprising:

initiating, by the first core, a state change of the first cache line, the initiating comprising specifying a timeout value in a request directed to the first cache line that is sent to a directory managing coherence between the first L1 cache and the second L1 cache, wherein the directory configures a state change that is to occur according to the timeout value, and wherein the first L1 cache configures a state change of the first cache line that is to occur according to the timeout value;

based on the first request, sending, by the directory, to the second L1 cache, a second request specifying the second cache line, and, based thereon, the second L1 cache changes state of the second cache line and provides data from the second cache line to the first L1 cache;

applying, by the first L1 cache, the provided data to the first cache line; and changing the state of the first cache line, by the first L1 cache, based on the timeout value.

* * * * *